United States Patent [19]

Rodriguez

[11] Patent Number: 5,483,306
[45] Date of Patent: Jan. 9, 1996

[54] SOUNDTRACK INTERFACE FOR MOTION PICTURE PROJECTOR

[75] Inventor: Nestor M. Rodriguez, Rochester, N.Y.

[73] Assignee: Eastman Kodak Company, Rochester, N.Y.

[21] Appl. No.: 245,109

[22] Filed: May 17, 1994

[51] Int. Cl.$^6$ .................................................. G03B 31/02
[52] U.S. Cl. .................................................. 354/10; 352/27
[58] Field of Search ........................................ 352/10, 27

[56] References Cited

U.S. PATENT DOCUMENTS

| | | | |
|---|---|---|---|
| 3,964,826 | 6/1976 | Joseph et al. | 352/27 |
| 3,969,593 | 7/1976 | Vlahos | 179/100.3 B |
| 4,235,531 | 11/1980 | McCormack | 352/27 |
| 4,367,930 | 1/1983 | Kolb, Jr. | 352/27 |

*Primary Examiner*—Russell E. Adams
*Attorney, Agent, or Firm*—Thomas H. Close

[57] ABSTRACT

A soundtrack interface for a motion picture projector allows the projector to sense dye only soundtracks or silver soundtracks. The system includes: a) an infrared filter: b) means for moving the infrared filter into the optical path between the sound system light source and photo detector when a film having a dye only soundtrack is to be projected, and for moving the infrared filter out of the optical path when a film having a silver soundtrack is to be projected; c) a preamplifier; and d) means for switching the preamplifier into a circuit between the photo detector and the sound amplifier when a film having a dye only soundtrack is to be projected and out of the circuit when a film having a silver soundtrack is to be projected.

4 Claims, 5 Drawing Sheets

SOUNDTRACK INTERFACE FOR MOTION PICTURE PROJECTOR

FIELD OF THE INVENTION

The invention relates generally to the field of motion pictures, and in particular to apparatus for sensing the soundtrack on a motion picture film in a motion picture projector.

BACKGROUND OF THE INVENTION

Motion picture print film, the film that is shown in movie theaters, commonly employs an optical soundtrack along the edge of the film. A light source illuminates the optical soundtrack and a photosensor senses the light passing through and modulated by the soundtrack to produce an audio signal that is sent to amplifiers of the theater sound system. It is currently the practice to develop the sound track separately from the picture image on color motion picture film so that a silver image is left in the soundtrack area of the film, whereas all the silver is removed in the area of the picture, leaving only a dye image. There is current interest within the motion picture film processing community (because of growing laboratory processing costs and environmental concerns with the processing chemistry employed to process the soundtrack) to replace the silver soundtrack in motion picture print film with a "dye only" soundtrack. This would allow the entire width of film to be processed using the same chemistry, thereby realizing savings in processing and lessening environmental concerns.

Due to the spectral differences between the silver and the dye only soundtracks, the dye only sound track cannot be used in existing sound motion picture projectors. These sound systems incorporate a photodiode in the projector whose radiant sensitivity peaks at approximately 800–950 nanometers (depending on the type of photodiode) to detect the predominant infra-red (IR) radiation emitted by the tungsten lamp and modulated by the film's variable area silver soundtrack. The dye only sound track modulates light predominantly in the visible region of the spectrum. Although the photodiodes have some sensitivity in the visible range (approximately 380–760 nanometers) of the radiation spectrum, their lower sensitivity in this range, coupled with the lower emission of the light source in the visible range results in a very low input to the sound amplifier. The situation is further aggravated by the fact that the density range between the "clear" minimum density ($D_{min}$) area and the "opaque" maximum density ($D_{max}$) area is less for the dye only soundtrack. If the signal is too low for the amplification stage to operate properly (e.g. signal-to-noise loss), the sound quality will be degraded. Any change in existing projectors to accommodate dye only soundtracks must be easily reversed so that existing film with silver soundtracks can also be projected, due to the vast number of existing projection prints with silver soundtracks. Finally, the adaptation of existing projector sound systems to use of dye only soundtracks must not add significant cost due to the highly cost conscious and competitive nature of the motion picture industry.

SUMMARY OF THE INVENTION

The present invention is directed to overcoming one or more of the problems set forth above. Briefly summarized, according to one aspect of the present invention, a soundtrack interface for a motion picture projector having an optical soundtrack sensing system including a light source and a photo detector, and a sound amplifier connected to the soundtrack sensing system, includes: a) an infrared filter: b) means for moving the infrared filter into the optical path between the light source and the photodetector when a film having a dye only soundtrack is to be projected, and for moving the infrared filter out of the optical path when a film having a silver soundtrack is to be projected; c) a preamplifier; and d) means for switching the preamplifier into a circuit between the photodetector and the sound amplifier when a film having a dye only soundtrack is to be projected and out of the circuit when a film having a silver soundtrack is to be projected.

The present invention has the advantage that the soundtrack interface can be inexpensively implemented, the quality of sound is not compromised, and the system is easily switchable from use with dye only to silver sound tracks.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
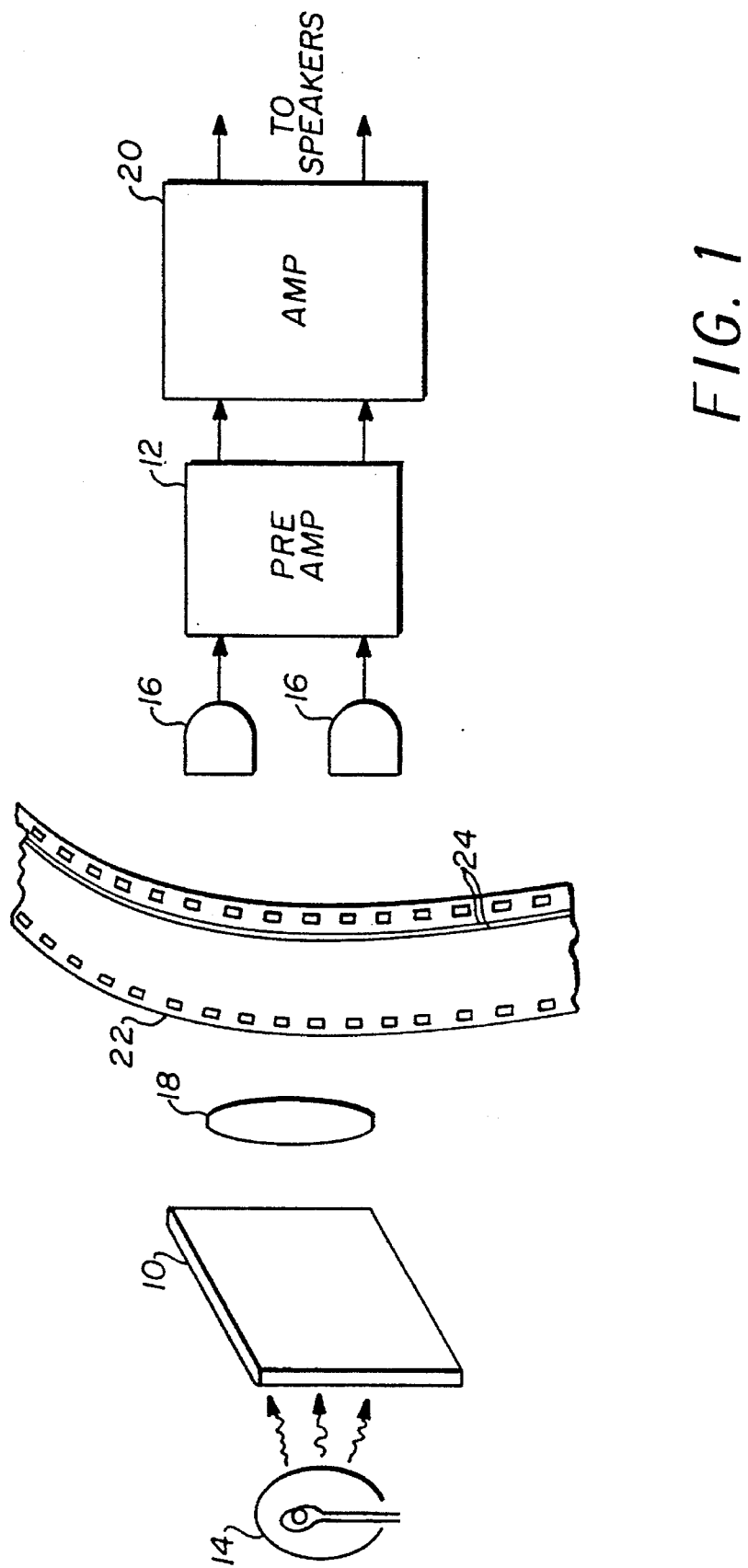
FIG. 1 is a schematic diagram of the soundtrack interface according to the present invention.

Referring to FIG. 1, the soundtrack interface of the present invention includes an infra-red filter 10 and a preamplifier 12. The infrared filter 10 is located between the light source 14 and the photodetectors 16 of the projector sound system. The infra-red filter 10 can be moved in and out of the optical axis of a sound system lens 18. The preamplifier 12 can be switched in and out of the circuit between the photodetectors 16 and a sound amplifier 20. The photodetectors 16 may comprise for example a split photodiode. In operation with a film having a silver soundtrack, the filter 10 is moved out of the optical path of the lens 18, and the preamplifier is switched out of the circuit between the photodetectors 16 and the sound amplifier 20. A motion picture film 22 having silver sound tracks 24 is positioned for movement between the lens 18 and the photodetectors 16. The light from light source 14 is projected by lens 18 through the silver sound tracks 24 onto photodetectors 16. The output from the photodetectors is amplified by the sound amplifier 20 and sent to the theater speakers (not shown). In operation with a film having a dye only soundtrack, the filter 10 is moved into the optical path of the lens 18, and the preamplifier is switched into the circuit between the photodetectors 16 and the sound amplifier 20. The filtered light from light source 14 is projected through the dye only soundtracks 24 onto photodetectors 16. The output from photodetectors 16 is amplified by the preamplifier 12 and then the output of the preamplifier 12 is amplified by amplifier 20 and sent to the theater speakers.

Figure 2:
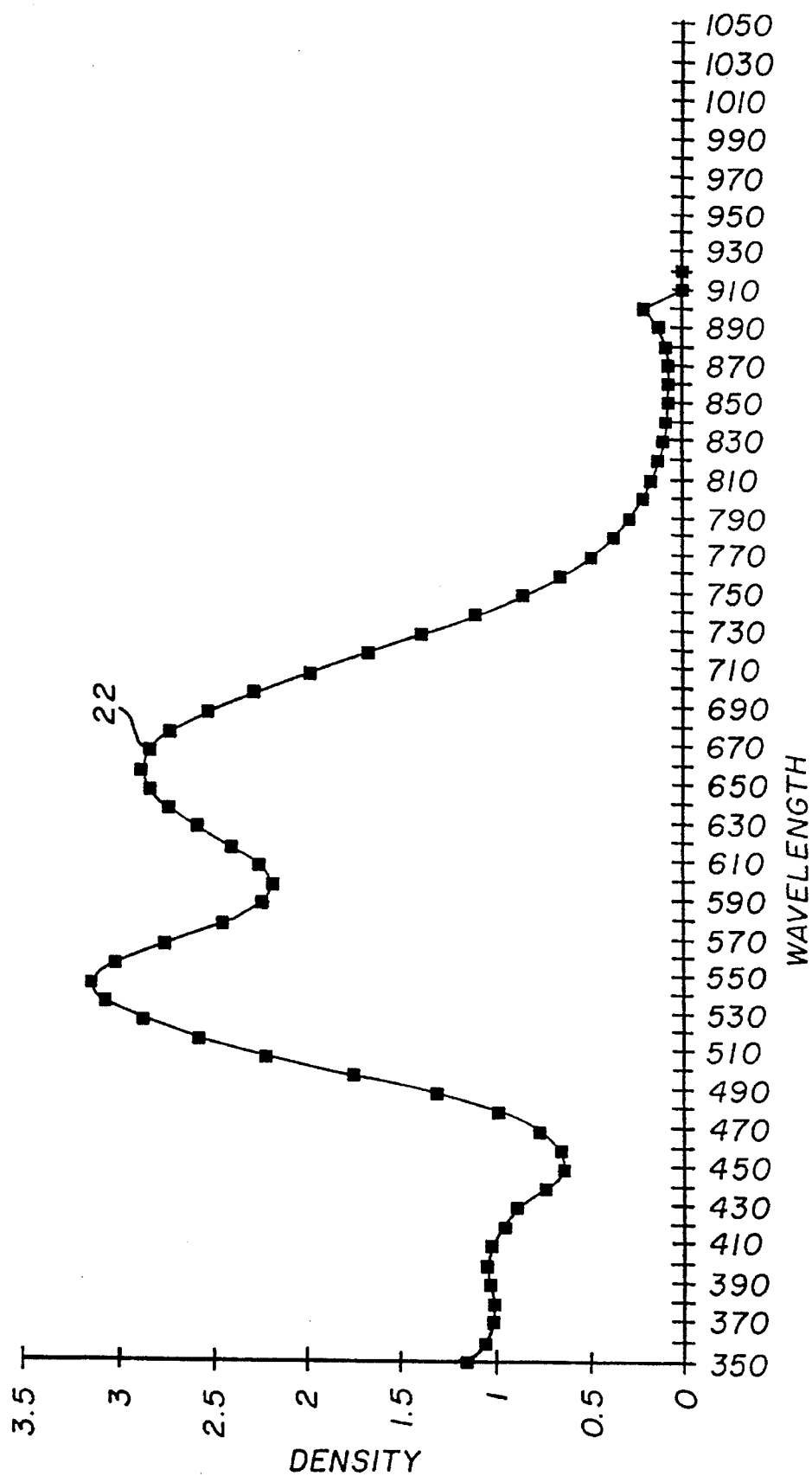
FIG. 2 is a plot of dye density versus wavelength for a typical dye only soundtrack.
Figure 3:
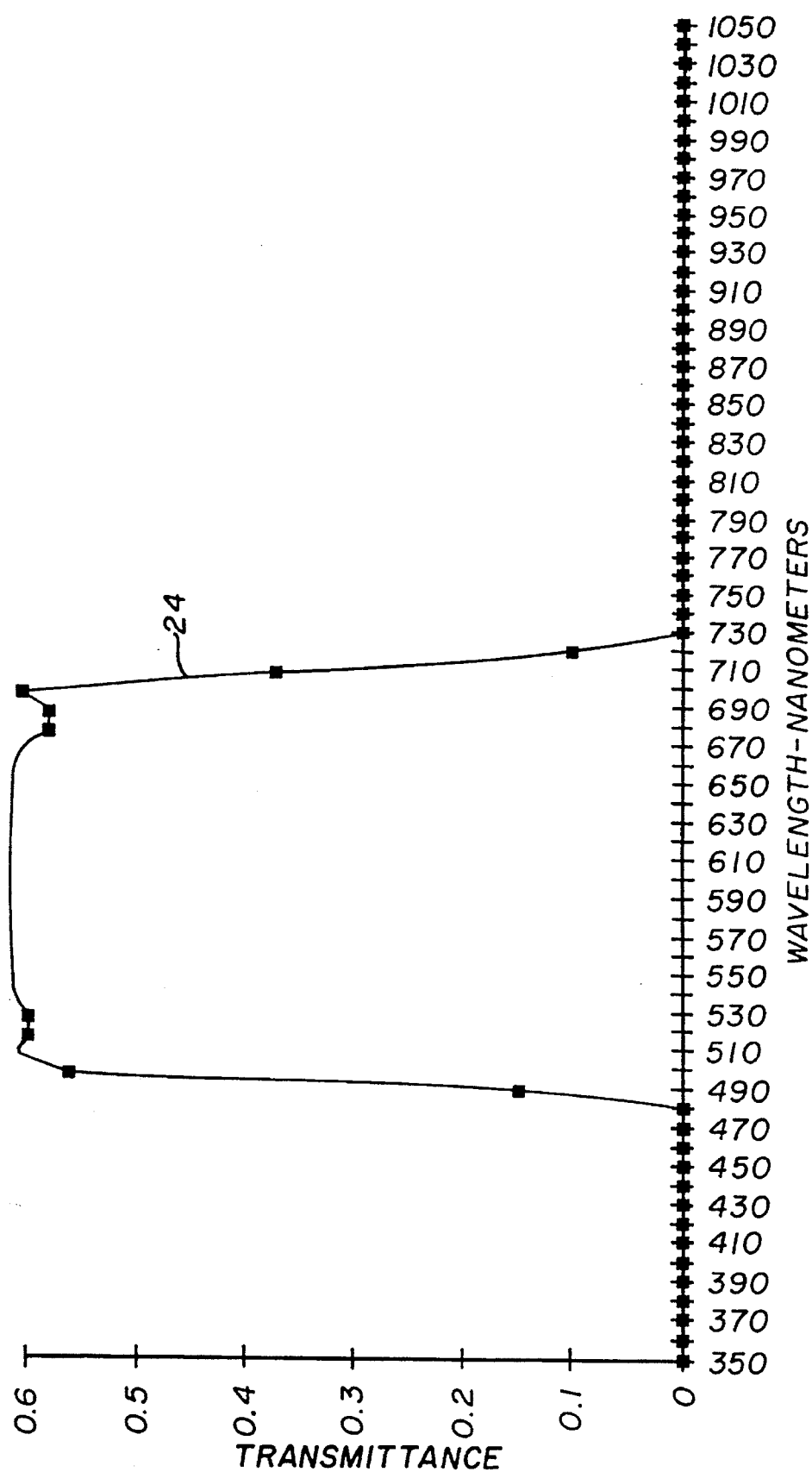
FIG. 3 is a plot of transmittance versus wavelength of an infrared filter optimized for a dye only sound track according to the present invention.

The bandpass of filter 10 is optimized for the spectral bandpass of the dye in the dye only soundtracks and to block off 1R radiation transmitted by the dyes. FIG. 2 is a plot labeled 22 showing the optical density versus wavelength of the a typical dye only motion picture soundtrack (e.g. a soundtrack developed in the same manner as the image is developed to remove all silver on EASTMAN 5386 motion picture print film). FIG. 3 is a plot labeled 24 of an infrared filter optimized to detect the presence of the dye shown in FIG. 2. Such a filter can be fabricated using known dichroic filter techniques or, a reasonable approximation may be had by choosing a conventional glass oxide or gel filter with a suitable bandpass.

Figure 4:
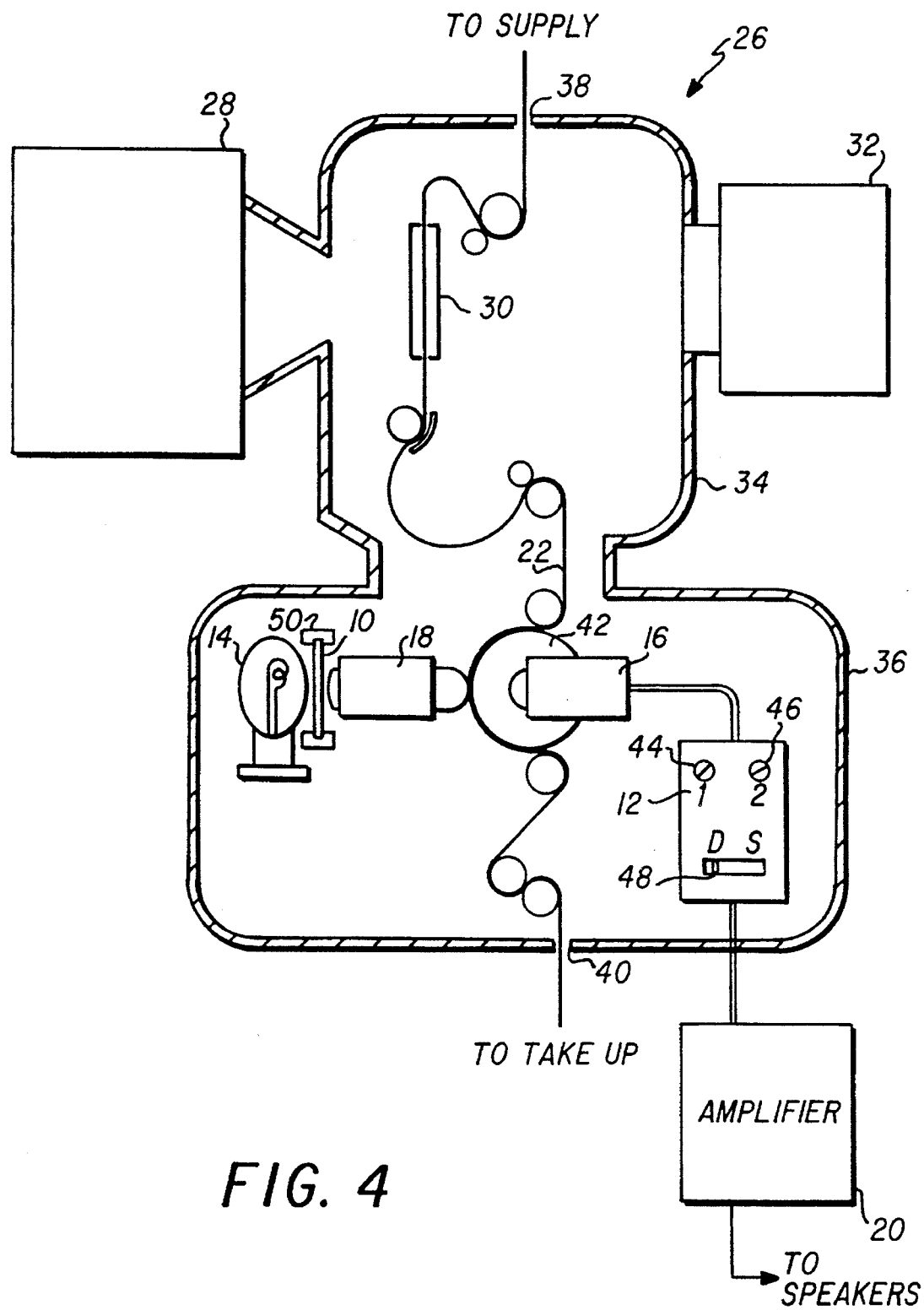
FIG. 4 is a schematic diagram of a sound motion picture projector incorporating the soundtrack interface of the present invention.

Turning now to FIG. 4, the sound track interface according to the present invention is shown in a typical sound motion picture projector generally designated 26. The projector 26 includes a projection light source 28, a film gate 30 and a projection lens 32 associated with a projection housing 34. The sound system is contained in a sound assembly housing 36. The film 22 enters the projection housing from a supply (not shown) through an opening 38 in the top of housing 36. After passing through the projection housing 34 and the sound assembly housing 36, the film exits through an opening 40 in the bottom of the sound assembly housing to a film take up (not shown). In the sound assembly housing 36, the film 22 passes partially around a drum 42. The edge of the film bearing the soundtrack extends beyond the edge of the drum and passes between the sound system lens 18 and the photo diodes 16. As shown in FIG. 4, the preamp 12 is provided with gain adjusting potentiometers 44 and 46 for adjusting the gain of the preamplifier in each of the channels. A switch 48 is also provided for switching the preamplifiers into and out of the sound system circuit when using film with dye only soundtrack or silver soundtrack, respectively. The infrared filter 10 is carried in a slide 50 so that the filter 10 can be moved in and out of the optical axis of lens 18 when using film with dye only soundtrack or silver soundtrack, respectively.

Figure 5:
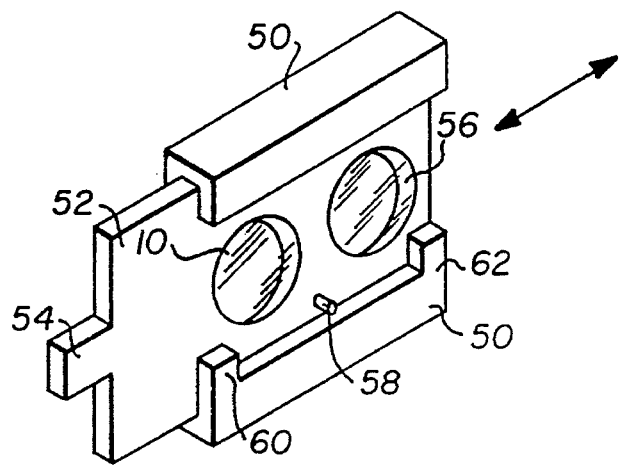
FIG. 5 is a is perspective view of the filter slide assembly used with the soundtrack interface of the present invention.

Turning now to FIG. 5, the infrared filter assembly will be described. The infrared filter 10 is carried in a carrier 52 having a manually accessible tab 54 and a clear glass window 56. The carrier 52 rides in slide 50 and is moveable between a first position determined by a pin 58 and a stop 60 where the clear glass window is disposed in the optical axis of lens 18 and a second position determined by pin 58 and a second stop 62 wherein the filter 10 is positioned in the optical axis of lens 18. The clear glass window 56, having the same thickness as the filter 10, is provided so that the optical path geometry with the filter in and out is the same.

Figure 6:
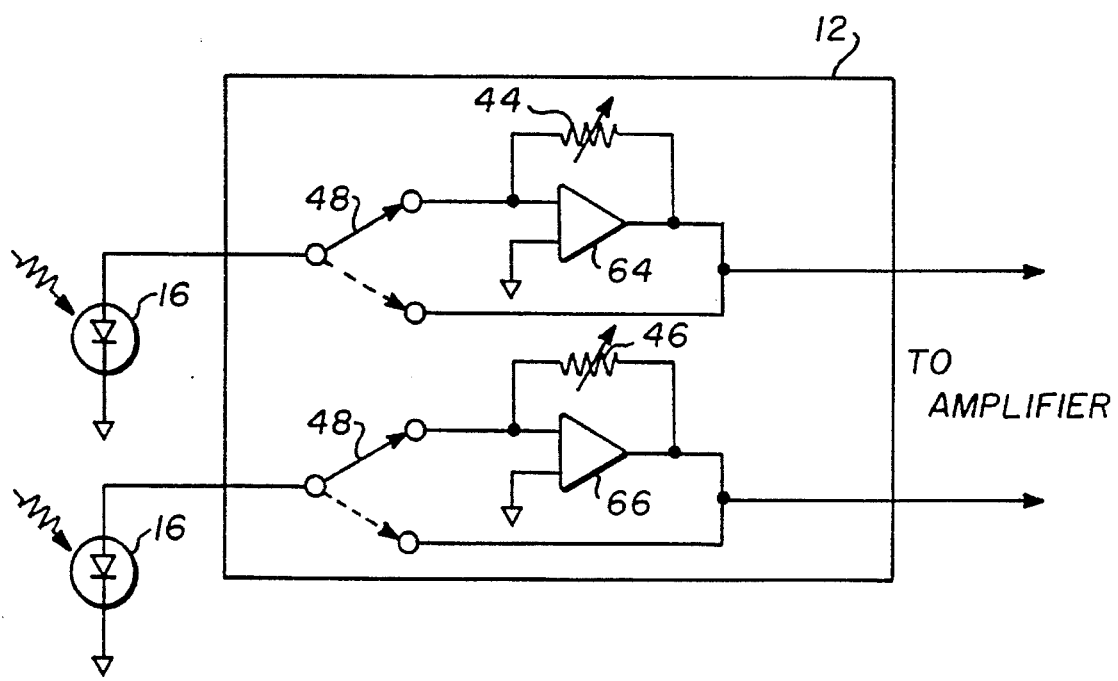
FIG. 6 is a schematic diagram of the preamplifier circuit employed with the soundtrack interface of the present invention.

Turning now to FIG. 6, the preamplifier 12 will be described in further detail. The preamplifier 12 includes a pair of operational amplifiers 64 and 66 provided with variable gain resistors 44 and 46 respectively. The inputs of the operational amplifiers 64 and 66 are connected through switch 48 to the photodiodes 16 when the switch 48 is in the position shown. When switch 48 is moved to its alternative position (shown in phantom), the operational amplifiers are bypassed and the signal from photodiodes 16 are applied directly to the sound amplifier (not shown). The operational amplifiers 64 and 66 preferably have an adjustable gain of between 0 and 30 dB up to 10 KHZ bandwidth.

The soundtrack interface is calibrated by measuring the output of the pre amplifier in the bypass mode in response to maximum and minimum silver soundtrack densities with the clear filter 56 in the optical axis of the lens 18. The same procedure is repeated with the infrared filter 10 in the optical axis of lens 18, the preamplifiers 64 and 66 switched into the circuit, and the maximum and minimum dye only soundtrack densities. The gain of the preamplifiers is adjusted via gain adjusting potentiometers 44 and 46 to match the dynamic range obtained with the corresponding minimum and maximum silver soundtrack densities. After calibration, the signals sent to the amplifier 20 will be similar for either silver or dye only soundtracks.

If needed, an offset control can be added to the input of the amplifiers 64 and 66, or neutral density added to the infrared filter 10 to maintain the minimum signals obtained with the dye only and the silver soundtracks at the same level.

The invention has been described with reference to a preferred embodiment. However, it will be appreciated that variations and modifications can be effected by a person of ordinary skill in the art without departing from the scope of the invention.

PARTS LIST 10 infra-red filter
12 preamplifier
14 light source
16 photodetectors
18 sound system lens
20 sound amplifier
22 motion picture film
24 sound tracks
26 projector
28 projection light source
30 film gate
32 projection lens
34 projection housing
36 sound assembly housing
38 top opening
40 bottom opening
42 drum
44 gain adjusting potentiometer
46 gain adjusting potentiometer
48 switch
50 slide
52 carrier
54 tab
56 clear glass window
58 pin
60 stop
62 stop
64 operational amplifier
66 operational amplifier

I claim:

1. A soundtrack interface for a motion picture projector having an optical soundtrack sensing system including a light source and a photo detector, and a sound amplifier connected to the soundtrack sensing system, comprising:

a) an infrared filter;
   b) means for moving said infrared filter into the optical path between the light source and the photo detector when a film having a dye only soundtrack is to be projected, and for moving said infrared filter out of said optical path when a film having a silver soundtrack is to be projected;

c) a preamplifier; and d) means for switching said preamplifier into a circuit between the photo detector and the sound amplifier when a film having a dye only soundtrack is to be projected and out of said circuit when a film having a silver soundtrack is to be projected.

2. The soundtrack interface claimed in claim 1, wherein said preamplifier is adjustable for gain.

3. The soundtrack interface claimed in claim 2, wherein said preamplifier is an operational amplifier.

4. The soundtrack interface claimed in claim 1, wherein said soundtrack is a stereo soundtrack.

* * * * *